United States Patent [19]

Matsumoto et al.

[11] Patent Number: 4,709,816
[45] Date of Patent: Dec. 1, 1987

[54] RECORDING DISC CARTRIDGE

[75] Inventors: Fujio Matsumoto, Ibaraki; Hajime Doi, Ibaraki; Kunio Mizushima, Ibaraki; Masaya Funahashi, Osaka; Tomizo Taniguchi, Kyoto; Shoichi Sakamoto, Ibaraki, all of Japan

[73] Assignee: Hitachi Maxell, Ltd., Osaka, Japan

[21] Appl. No.: 838,474

[22] Filed: Mar. 11, 1986

[30] Foreign Application Priority Data

Mar. 14, 1985 [JP] Japan .................................. 60-49436
Apr. 30, 1985 [JP] Japan .................................. 60-94084

[51] Int. Cl.$^4$ ........................ G11B 5/70; B65D 85/57
[52] U.S. Cl. .................................... 206/444; 360/133; 428/694; 428/695; 428/900; 428/35; 428/68; 428/74
[58] Field of Search .................. 428/694, 900, 695, 35, 428/68, 74; 360/132, 133; 206/444

[56] References Cited

U.S. PATENT DOCUMENTS

| | | | |
|---|---|---|---|
| 4,135,016 | 1/1979 | Ogawa et al. | 428/900 |
| 4,223,361 | 9/1980 | Zaitsu et al. | 428/900 |
| 4,251,843 | 2/1981 | Masuyama et al. | 360/133 |
| 4,414,597 | 11/1983 | Cornin | 360/133 |
| 4,420,532 | 12/1983 | Yamaguchi et al. | 428/694 |
| 4,485,421 | 11/1984 | Hoshino | 360/133 |
| 4,579,778 | 4/1986 | Yamaguchi et al. | 428/694 |
| 4,610,352 | 9/1986 | Howey et al. | 206/444 |

Primary Examiner—Paul J. Thibodeau
Attorney, Agent, or Firm—Birch, Stewart, Kolasch & Birch

[57] ABSTRACT

A recording disc cartridge comprising a recording disc containing, at least in its surface layer, at least one compound selected from the group consisting of an aliphatic acid and its salt and derivative, a case in which the recording disc is rotatively contained, and a liner comprising polyester fiber which is interposed between the case and the recording disc with facing the disc, which has good durability and less drop out.

8 Claims, 6 Drawing Figures

RECORDING DISC CARTRIDGE

BACKGROUND OF THE INVENTION

1. Field of the Invention

The present invention relates to a recording disc cartridge. More particularly, it relates to a recording disc cartridge such as a magnetic disc cartridge and a magnetic optical recording disc cartridge comprising a disc containing a lubricant.

2. Description of Related Art

A magnetic disc cartridge has an opening in a case so as to slide the magnetic disc against a magnetic head. However, dust entering the case from the opening in the case or particles generated by sliding of the disc against the magnetic head adhere on the surface of the disc so that the electromagnetic conversion characteristic of the disc is reduced. To prevent adherence of the dust and the particles, a liner is provided between the disc and the case so that the linear contacts the surface of the disc and wipes off the dust and the particles. One conventionally used liner is made of a non-woven fabric produced by dispersing polypropylene is a matrix of rayon lint and melting polypropylene to bind the rayon fibers together.

The magnetic disc is required to have good durability since it slides on the magnetic disc at a high relative speed during recording and reproducing. To improve the durability of the magnetic disc, liquid paraffin is usually added in a magnetic layer of the disc. The liquid paraffin exudes from the magnetic layer and is contained in the liner in the case. Then, the praffin is continuously supplied to the surface of the magnetic disc in use to reduce a coefficient of friction between the disc surface and the magnetic head, and thereby the durability of the disc is improved (cf. U.S. Pat. No. 4,223,361).

Recently, the thickness of the magnetic layer of the disc has been thinner and thinner in order to increase the recording density, and therefore, the absolute amount of lubricant to be contained in the magnetic layer decreases. Thus, the small amount of liquid paraffin cannot impart enough durability to the magnetic disc.

It has been proposed to use an aliphatic acid compound such as an aliphatic acid or its derivatives as the lubricant to be contained in the magnetic layer of the magnetic disc in order to maintain the necessary durability of the disc even when the magnetic layer is thin enough for high recording density. However, the aliphatic acid compound lubricant causes drop out when the magnetic disc with the aliphatic acid compound is used in the case using the conventional liner.

SUMMARY OF THE INVENTION

One object of the present invention is to provide a recording disc cartridge with good durability even when the magnetic layer is made thin for the purpose of having a high recording density.

Another object of the present invention is to provide a recording disc cartridge with less drop out when an aliphatic acid compound is contained in the recording disc.

According to the present invention, there is provided a recording disc cartridge comprising a recording disc containing, at least in its surface layer, at least one compound selected from the group consisting of an aliphatic acid and its salt and derivative, a chase in which the recording disc is rotatively contained, and a liner comprising polyester fibers which is interposed between the case and the recording disc, facing the disc.

DETAILED DESCRIPTION OF THE INVENTION

Figure 1:
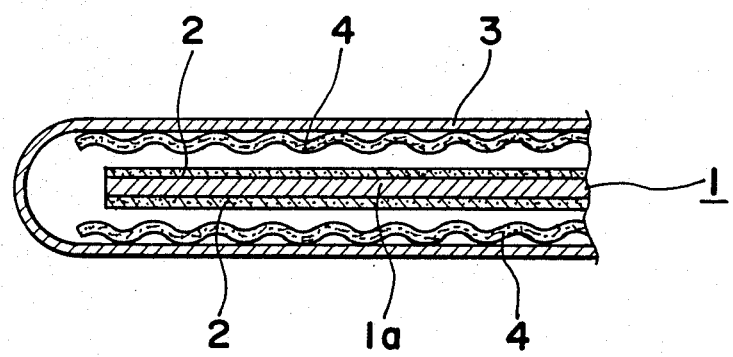
FIG. 1 is a partial cross sectional view of one embodiment of the recording disc cartridge according to the present invention.

The present invention has been completed based on the following findings.

The cause of drop out has been investigated by comparing a disc containing liquid paraffin as a lubricant with a disc containing the aliphatic compound as a lubricant.

The non-woven fabric to be used as a matrix of the liner is usually made by fusion bonding a part of the fibers between a pair of embossing rolls having such surfaces that they can transfer emboss to the fabric. During embossing, convex parts of the rolls contact with the fibers and fuse a thermally fusing material contained in the fibers to partially fusion bond the fibers with the melt fusing material. In the case of the liner produced in such a manner, polypropylene fibers are usually blended in the matrix as the thermally fusing material and fusion bonds the rayon lint when the lint is contacted with the embossing rolls. However, a part of polypropylene melt does not participate in the bonding of the fibers but forms spherical beads some of which will easily be removed from the liner.

When the lubricant contained in a magnetic recording medium, such as the disc is liquid paraffin, the polypropylene beads are only slightly removed from the liner. Even if the polypropylene beads are removed from the liner, they are easily trapped again by the liner when the disc slides against the liner during recording the reproducing since the magnetic layer of the disc is not plasticized with liquid paraffin and the surface of the layer is less tacky. Thus, the drop out of the recording disc is not a severe problem when the liquid paraffin is used as the lubricant.

On the contrary, when the aliphatic acid compound is used as the lubricant, the polypropylene beads tend to be transferred from the liner to the surface of the recording disc. In addition, since the magnetic layer has good affinity with the aliphatic acid compound, the former is plasticized with the latter so that the tackiness of the surface of the former is increased. Therefore, the dropped polypropylene beads are not readily trapped by the liner. Since the polypropylene beads are comparatively hard and microscopically deformed to a nail-like form when they are pressed by the convex portions of the embossing rolls and the magnetic layer is softened by plasticization, the surface of the magnetic layer tends to be scraped by the deformed beads to generate an abraded powder. If addition, it is difficult to wipe away the generated powder from the surface of the magnetic layer since the powder has less affinity with polypropylene contained in the liner and the surface of the magnetic layer is tacky due to plasticization. Although the use of the aliphatic acid compound as the lubricant may improve the durability of the disc, it causes drop out due to the unwiped polypropylene beads on the surface of the magnetic layer and the abraded powder of the magnetic layer.

As a result of extensive study, it has been determined that a liner matrix made of polyester fiber can prevent the transfer of the beads from the liner to the disc surface while improving the durability of the recording disc cartridge since the lubricating effect of the aliphatic acid compound lasts longer.

Embodiments of the present invention will now be described by way of example, with reference to the accompanying drawings.

Figure 2:
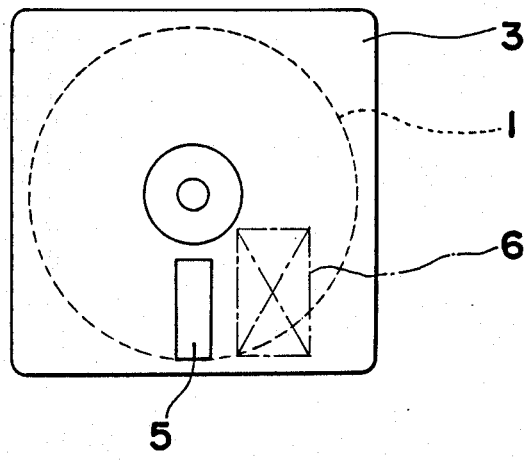
FIG. 2 is a front view of the recording disc cartridge.

FIG. 1 shows a partial cross sectional view of one of the preferred embodiments of the recording disc cartridge according to the present invention, which has substantially the same structure as that of the conventional one. The cartridge comprises a magnetic disc 1 made of a non-magnetic substrate 1a both surfaces of which are coated with magnetic layers 2,2, a case 3 surrounding the disc 1, and liners 4 each of which is made of a non-woven fabric and attached on the entire inner surface of the case facing the magnetic disc. The case 3 has rectangular openings 5 on both sides, as shown in FIG. 2. Through the openings 5, the recording disc 1 slides against the magnetic head. The case may be the same as used for the fabrication of the conventional cartridge such as a soft jacket made of a soft resin sheet such as a sheet of flexible polyvinyl chloride resin and a hard case made by molding a rigid resin, such as ABS resin, in a suitable form.

One of the characteristics of the present invention resides in that the magnetic layers 2,2 of the magnetic disc 1 contain, as the lubricant, at least one aliphatic acid compound such as an aliphatic acid, its salt or derivative, such as an ester and an amide.

Specific examples of the aliphatic acid are myristic acid, palmitic acid, oleic acid, stearic acid and docosanoic acid (behenic acid). The acid salts include salts with lithium, sodium, calcium, magnesium, aluminum, cobalt, zinc, barium and lead. The esters include ethyl, butyl or monoglyceride stearate, monoglyceride palmitate, monoglyceride oleate and pentaerytritol tetrastearate. The acid amides include caproic amide, capric amide, lauric amide, palmitic amide, stearic amide, docosanoic amide, oleic amide, linolic amide and methylenebisstearic amide. Among them, the esters of unsaturated aliphatic acids are preferred.

The aliphatic acid compound to be used as the lubricant according to the present invention is in a liquid state in a wide temperature range so that its presence in a suitable amount on the surface of the magnetic layer greatly improves resistance to abrasion of the magnetic layer so that the durability of the magnetic disc is considerably improved. As is apparent from the examples described below, the lubricating effect of the aliphatic acid compound is far superior to that of the liquid paraffin and to a solid ester of a saturated aliphatic acid. Therefore, the aliphatic acid compound can improve the durability of the disc even when the magnetic layer is made thin for the purpose of high recording density.

The aliphatic acid compound to be used according to the present invention is in the liquid state at a room temperature. Preferably, it has a high boiling point, namely a large molecular weight to prevent evaporation and consumption of the lubricant, so that the lubricating effect lasts for a long time. Particularly, an aliphatic acid compound having at least 26 carbon atoms is preferred. Examples of such aliphatic acid compounds are esters of unsaturated higher aliphatic acids, such as oleic acid, linolic acid and linoleic acid with an alcohol having about 8 to 18 carbon atoms.

The amount of the aliphatic acid compound to be added to the magnetic layer is 1.0 to 40.0 parts by weight per 100 parts by weight of the magnetic powder. When the amount of the aliphatic acid compound is less than the lower limit, the lubricating effect is not sufficiently exerted. When it is larger than the upper limit, the surface of the magnetic layer becomes sticky so that the dust easily adheres to it, and further a gap between the magnetic head and the surface of the magnetic layer is widen, this resulting in a decrease of output due to spacing loss.

The magnetic disc is fabricated by a per se conventional method. For example, on both surfaces of a non-magnetic substrate such as a polyester film, a magnetic coating containing magnetic powder, a binder, an organic solvent and optionally additives is applied, dried and calendered to form magnetic layers and then blanked to form a disc with a desired diameter.

The magnetic powder may be any of the conventionally used powders. Specific examples of the magnetic powder are metal oxide powder (e.g. $\gamma$-$Fe_2O_3$, $Fe_3O_4$, cobalt-containing $\gamma$-$Fe_2O_3$, cobalt-containing $Fe_3O_4$, $CrO_2$ and Ba, Sr or Pb ferrite) and metal powder (e.g. iron, nickel and cobalt, alloys of them, alloys of at least one of these metals and other metal or a small amount of a non-metallic element). The binder may be a conventionally used one and includes vinyl chloride-vinyl acetate type copolymer, cellulose resin polyvinyl butyral, polyester resin, polyurethane, epox resin and polyol as well as a polyisocyanate compound as a cross linking agent. Examples of the optionally used additive are a dispersing agent, an abrasive, an antistatic agent and the like.

The thickness of the magnetic layer (on one surface) is usually from 0.5 to 2.0 $\mu$m.

Alternatively, the magnetic layer may be formed by deposition of metal on the substrate, for example, by metal-vaporizing and plating.

One other characteristic of the present invention is that the recording disc cartridge has the liner comprising polyester fiber between the disc and the case. Since the polyester fiber itself does not form any bead which is transferred from the liner to the disc surface, generation of drop out caused by the beads is prevented. Further, since the liner itself is flexible, it does not scrape the surface of the magnetic layer even if the magnetic layer is plasticized with the aliphatic acid compound. Therefore, the formation of particles or powder from the liner and the magnetic layer, which is the cause of drop out, is substantially completely prevented. In addition, since the affinity between the polyester fiber and the aliphatic acid compound is good, ability of the liner for holding the aliphatic acid compound is good so that the lubricating effect of the aliphatic acid compound lasts long and the durability of the recording disc is greatly improved.

The non-woven fabric to be used as the liner according to the present invention may be wholly a polyester fiber fabric or a mixed fabric of polyester fiber with other fibers such as rayon fibers. Preferably, the mixed fabric contains at least 30% by weight of the polyester for sufficiently fusion bonding the fibers together. More preferably, the mixed fabric contains 40 to 90% by weight of polyester fiber, in which range, the liner more effectively traps any foreign material including the lubricant on the disc surface.

The liner is fabricated by a per se conventional method. For example, a mass of the fiber is pressed between a pair of the embossing rolls, and a part of the polyester fibers is fused so as to partially bond the fibers together. The formed fabric is cut in a desired shape and size and placed on the inner surface of the case. Since the polyester fiber has good fusibility, it is easily processed at a lower temperature then the polypropylene containing rayon fiber.

Figure 3:
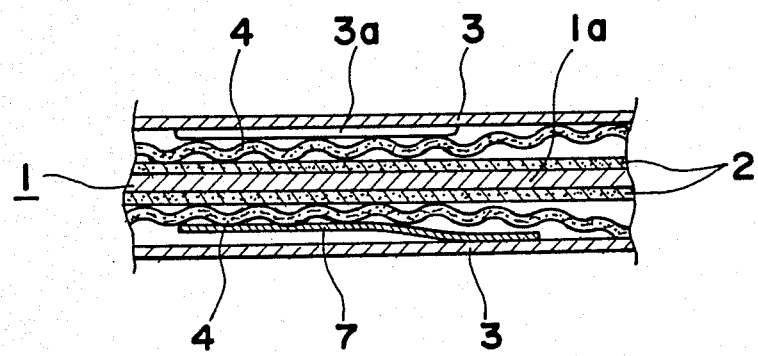
FIG. 3 is a partial cross sectional view of another embodiment of the recording disc cartridge according to the present invention.

The contact of the liner with the magnetic layer in the disc cartridge is achieved in various manners. For example, when the case of the cartridge is the soft case and installed in a recording and reproducing apparatus, as shown in FIG. 2, a pair of pressure plates 6 automatically press the liner to prevent fluttering of the disc and to clean the surface of the magnetic layer in use. Therefore, the liners are firmly contacted to the surfaces of the magnetic disc at the position of the pressure plate 6. When the case of the cartridge is the hard case, as shown in FIG. 3, a slightly bent resilient element 7 is interposed between the liner 4 and the case 3 on one side of the disc 1. The resilient element is made of, for example, a strip of a rigid synthetic resin sheet and a protrusion 3a is formed on the opposite side of the case 3. The protrusion 3a may comprise parallel ridges. The liners 4,4 and the magnetic layers 2,2 are contacted by the pressure exerted by the resilient element 7 between the element 7 and the protrusion 3a. Instead of the protrusion 3a, the same resilient element as the element 7 may be used.

PREFERRED EMBODIMENTS

Practically and presently preferred embodiments of the present invention are shown in the following examples, wherein parts and % are by weight.

EXAMPLE 1

Figure 4:
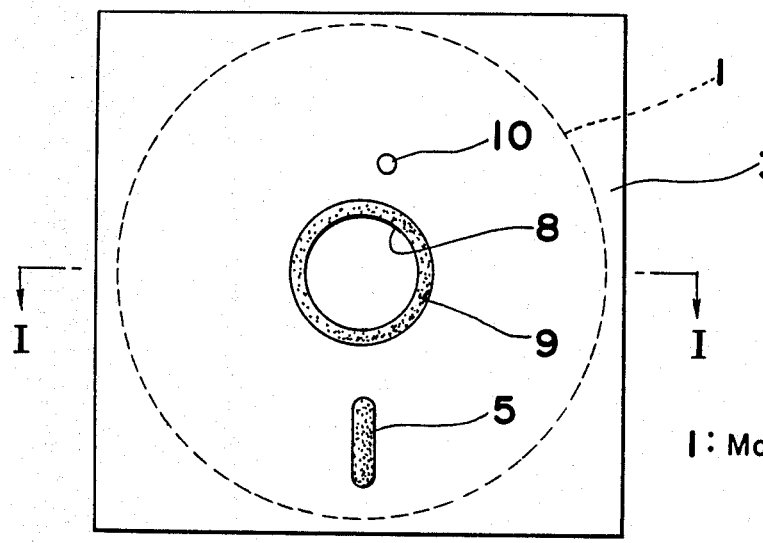
FIG. 4 is a front view of a further embodiment of the recording cartridge according to the present invention.
Figure 5:
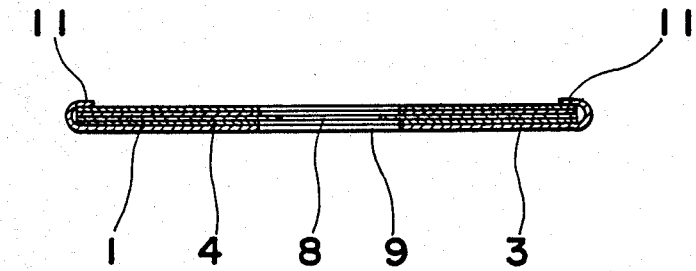
FIG. 5 is a cross sectional view of the cartridge of FIG. 4 along the line I—I.
Figure 6:
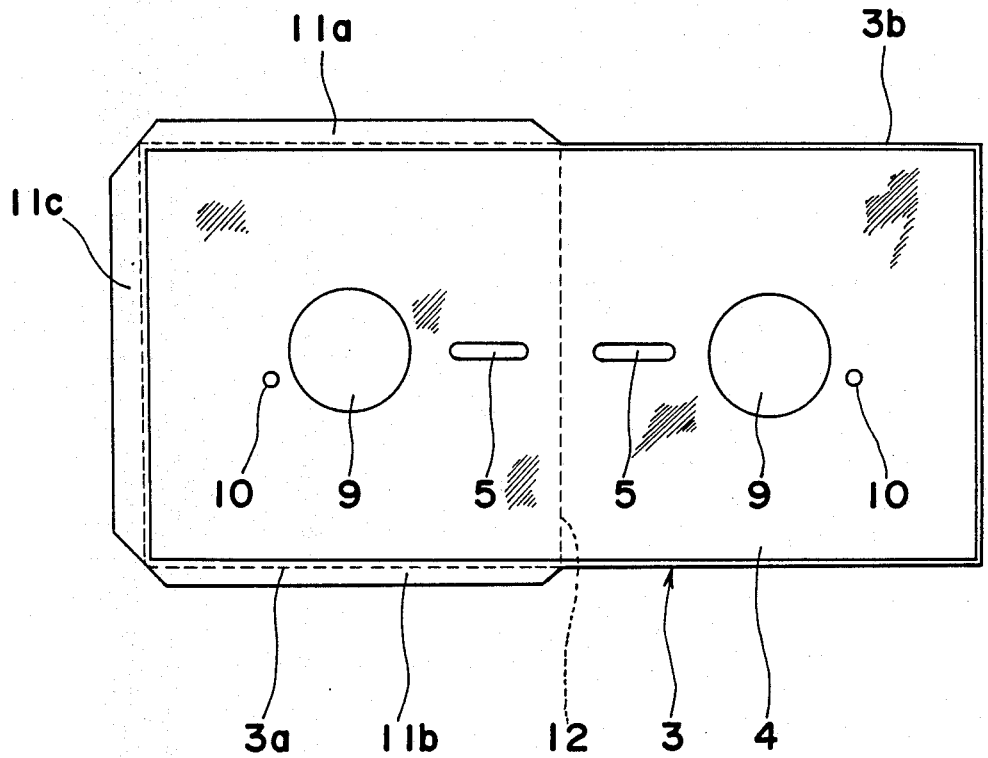
FIG. 6 is a front view of the unfolded case of the recording disc cartridge with the liner.

A magnetic disc cartridge shown in FIGS. 4, 5 and 6 was produced. The cartridge comprised a disc 1, a case 3 in which the disc 1 was rotatively contained and a liner 4 placed between the disc 1 and the case 3.

The magnetic disc 1 consists of a polyester base film with a thickness of 75 μm on each surface of which a magnetic layer with a thickness of 1.5 μm was formed. The magnetic layer was formed by applying a magnetic coating having following composition on the base film:

| Composition | Parts |
|---|---|
| Co-containing γ-Fe$_2$O$_3$ | 300 |
| Nitrocellulose resin | 50 |
| Polyurethane resin | 30 |
| Trifunctional low molecular weight isocyanate | 20 |
| Carbon black | 15 |
| α-Fe$_2$O$_3$ | 5 |
| Cyclohexanone (hexane ?) | 400 |
| Toluene | 400 |

On the magnetic layer, a 5% solution of oleyl oleate in toluene was applied so that 5 mg/100 cm$^2$ of oleyl oleate was impregnated in the magnetic layer and then calendered at 50° C. under 20 kg/cm$^2$. At the central portion of the disc 1, there was formed a circular window 8 through which a driving shaft of a recording and reproducing apparatus is inserted. Around the window 8, a recording zone with a predetermined width was formed.

As shown in FIG. 6, in the unfolded state, the case 3 consisted of two square parts 3a and 3b and three flaps 11a, 11b and 11c on the edges of the part 3a. The case was made of, for example, a polyvinyl chloride sheet. The liner 4 was place on the inner surface of the case 3 and consists of two square parts having a slightly smaller size than the case. The liner 4 was made of a non-woven mixed fabric of 50% of polyester and 50% of rayon (for example, #149-188 manufactured by Kendall) and attached to the case by partial fusion bonding.

Each of left and right parts of the case 3 and the liner 4 had a chucking opening 9, which had a larger diameter than the disc window 8 so tht the peripheral portion of the disc around window 8 could be exposed, a recording and reproducing opening 5 through which the magnetic head was contacted with the magnetic layer of the disc, and a sensor aperture 10 for tracking.

The case and the liner were folded along the center line 12 with containing the disc between the two parts of them. The flaps were folded over the outside of the part 3b and fusion bonded to assemble the magnetic disc cartridge.

COMPARATIVE EXAMPLE 1

In the same manner as in Example 1 but using liquid paraffin in place of oleyl oleate, a magnetic disc cartridge was fabricated.

COMPARATIVE EXAMPLE 2

In the same manner as in Example 1 but using a liner made of a non-woven mixed fabric of 80% of rayon fiber and 20% of polypropylene fiber (for example, JB-4F manufactured by Mitsubishi Rayon), a magnetic disc cartridge was fabricated.

The magnetic disc cartridges fabricated in Example 1 and Comparative Examples 1 and 2 were installed in a disc driving apparatus with rotation speed of 360 rpm and the drop out test was carried out three times on all the tracks to count the number of drop out. The durability was examined by sliding the magnetic head on the outermost track of the disc.

The results are shown in Table 1.

TABLE 1

| Example No. | 1 | Comp. 1 | Comp. 2 |
|---|---|---|---|
| Durability (hours) | 670 | 330 | 550 |
| Drop out No. after 1st run | 0 | 0 | 0 |
| Drop out No. after 2nd run | 0 | 0 | 3 |
| Drop out No. after 3rd run | 0 | 0 | 2 |

The magnetic disc of the present invention has better durability and less drop out which means good reliability.

EXAMPLE 2

A magnetic coating having following composition was prepared:

| Composition | Parts |
| --- | --- |
| Co-containing $\gamma$-Fe$_2$O$_3$ | 1,000 |
| Carbon black | 150 |
| $\alpha$-Fe$_2$O$_3$ | 100 |
| Oleyl oleate | 120 |
| Nitrocellulose resin (RS 1 by Daicel Chemical) | 156 |
| Polyurethane (HI 2000 by Dainippon Ink Chemical) | 156 |
| Polyisocyanate compound | 78 |
| Cyclohexanone | 2,000 |
| Toluene | 2,000 |

The magnetic coating was applied on both surfaces of a polyethylene terephthalate film with a thickness of 75 μm, dried and calendered to form magnetic layers each having a thickness of 1.3 μm. The film with the magnetic layers was blanked to form a magnetic disc.

A liner was made from a non-woven mixed fabric of 50% of polyester and 50% of rayon (#149-188 manufactured by Kendall) by partial fusion bonding and attached on an inner surface of a soft jacket made of flexible polyvinyl chloride.

The magnetic disc was placed between parts of the case to fabricate a magnetic disc cartridge.

EXAMPLE 3

In the same manner as in Example 2 but using octyl oleate in place of oleyl oleate, a magnetic disc cartridge was fabricated.

EXAMPLE 4

In the same manner as in Example 2 but using a liner made of a non-woven fabric of 100% polyester (#149-007 manufactured by Kendall), a magnetic disc cartridge was fabricated.

COMPARATIVE EXAMPLE 3

In the same manner as in Example 2 but using liquid paraffin in place of oleyl oleate, a magnetic disc cartridge was fabricated.

EXAMPLE 5

In the same manner as in Example 2 but using butyl stearate in place of oleyl oleate, a magnetic disc cartridge was fabricated.

COMPARATIVE EXAMPLE 4

In the same manner as in Example 2 but using a liner made of a non-woven fabric produced by blending polypropylene fiber with rayon fiber and fusing bonding the fiber by fusing a part of the polypropylene fiber (#149-027 manufactured by Kendall), a magnetic disc cartridge was fabricated.

Each of the disc cartridges fabricated in Examples 2 to 5 and Comparative Examples 3 and 4 was installed in a 5 inch high density disc drive and recorded at 250 KHz. Then, the traveling time till the reproducing output was reduced to 70% of the initial output was measured to evaluate the durability.

100 pieces of each cartridge were subjected to 1,000 hour random seek to find the number of the cartridges which generate read and write error, by which drop out characteristic was evaluated.

The results are shown in Table 2.

TABLE 2

| Example No. | Durability (hrs) (Traveling time) | No. of disc generating read & write error |
| --- | --- | --- |
| 2 | 1,305 | 0 |
| 3 | 1,300 | 0 |
| 4 | 1,310 | 0 |
| Comp. 3 | 400 | 0 |
| 5 | 650 | 0 |
| Comp. 4 | 1,290 | 5 |

As is apparent from the above results, the disc cartridges of the invention have good durability and less drop out, while the disc cartridge utilizing liquid paraffin as the lubricant (Comparative Example 3) or unsaturated aliphatic acid ester as the lubricant and the liner containing polypropylene beads (Comparative Example 4) has fair durability but tends to generate drop out.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A recording disc cartridge comprising a recording disc containing, at least in its surface layer, a lubricant comprising at least one compound selected from the group consisting of an aliphatic acid, its salt, ester and amide, a case in which the recording disc is rotatively contained, and a liner comprising at least 30% by weight polyester fiber which is interposed between the case and the recording disc, facing the disc.

2. The recording disc cartridge according to claim 1, wherein said liner comprises 40 to 90% by weight of polyester fiber.

3. The recording disc cartridge according to claim 1, wherein said liner comprises a non-woven mixed fabric of polyester fiber and rayon fiber.

4. The recording disc cartridge according to claim 1, wherein said recording disc comprises a magnetic surface layer which contains a magnetic powder and an ester of an unsaturated aliphatic acid as said lubricant.

5. The recording disc cartridge according to claim 4, wherein the amount of lubricant contained in said magnetic layer is from 1.0 to 40.0 parts by weight per 100 parts by weight of said magnetic powder contained in said magnetic layer.

6. The recording disc cartridge according to claim 4, wherein a thickness of said magnetic layer is 0.5 to 2.0 μm.

7. The recording disc cartridge according to claim 3, wherein said recording disc is a magnetic disc comprising a magnetic surface layer which contains an ester of an unsaturated aliphatic acid as said lubricant.

8. The recording disc cartridge according to claim 7, wherein said ester is at least one ester of an unsaturated aliphatic acid selected from the group consisting of oleic acid, linolic acid and linoleic acid with an aliphatic alcohol having from 8 to 18 carbon atoms.

* * * * *